(12) United States Patent
Kilim et al.

(10) Patent No.: US 12,343,304 B2
(45) Date of Patent: Jul. 1, 2025

(54) GUIDING A PERSON WHILE MOVING IN A CERTAIN AREA

(71) Applicant: STEP-HEAR SYSTEMS LTD, Tel Aviv (IL)

(72) Inventors: Moshe Kilim, Gan Shorek (IL); Ravit Kredi, Ramat-Gan (IL); Yishai Hatzir, Modiin (IL)

(73) Assignee: STEP-HEAR SYSTEMS LTD, Tel Aviv (IL)

( * ) Notice: Subject to any disclaimer, the term of this patent is extended or adjusted under 35 U.S.C. 154(b) by 58 days.

(21) Appl. No.: 18/267,697

(22) PCT Filed: Jan. 3, 2022

(86) PCT No.: PCT/IB2022/050017
§ 371 (c)(1),
(2) Date: Jun. 15, 2023

(87) PCT Pub. No.: WO2022/149054
PCT Pub. Date: Jul. 14, 2022

(65) Prior Publication Data
US 2024/0050304 A1 Feb. 15, 2024

Related U.S. Application Data

(60) Provisional application No. 63/135,043, filed on Jan. 8, 2021.

(51) Int. Cl.
*H04W 4/021* (2018.01)
*A61H 3/06* (2006.01)
(Continued)

(52) U.S. Cl.
CPC ........... *A61H 3/061* (2013.01); *G09B 21/006* (2013.01); *H04R 1/025* (2013.01);
(Continued)

(58) Field of Classification Search
CPC ..... H04W 4/021; H04W 4/024; H04W 4/025; H04W 4/40; H04W 4/80; H04R 1/025;
(Continued)

(56) References Cited

U.S. PATENT DOCUMENTS 9,072,650 B2 7/2015 Kim
2005/0099291 A1 5/2005 Steven
(Continued)

FOREIGN PATENT DOCUMENTS

CN 109330832 A 2/2019

OTHER PUBLICATIONS

International Search Report for International Application PCT/IB2022/050017, issued by Israel Patent Office, Issued on Feb. 28, 2022.

(Continued)

*Primary Examiner* — Dionne Pendleton
(74) *Attorney, Agent, or Firm* — Smith Tempel Blaha LLC; Gregory Scott Smith

(57) ABSTRACT

A system and a method are disclosed for giving wayfinding signals to a Person with Reduced Mobility (PRM) toward a desired location, wherein the PRM is in a certain area and wherein the wayfinding signals are adapted to a disability of the PRM. Guiding the PRM can be implemented by wayfinding signal that can be delivered via a mobile device (MD) of the PRM or via one or more speakers or buzzers that are associated with the certain area. The certain area can be a mall, a train station, a vehicle, etc. When the PRM is a blind person, then the wayfinding signals can be audible signals that lead the user from a current location toward a desired location.

6 Claims, 5 Drawing Sheets

(51) Int. Cl.
*G09B 21/00* (2006.01)
*H04R 1/02* (2006.01)
*H04W 4/024* (2018.01)
*G01S 13/76* (2006.01)

(52) U.S. Cl.
CPC .... *A61H 2201/5048* (2013.01); *G01S 13/765* (2013.01); *H04R 2499/13* (2013.01)

(58) Field of Classification Search
CPC ............. H04R 2499/13; G09B 21/006; G09B 21/008; G09B 21/009; G09B 21/001; G09B 29/106; G06Q 50/40; G06Q 30/0261; G06Q 30/0267; G01S 13/765; G01S 13/876; G01S 15/93; G01S 19/14; G01S 7/003; A61H 2201/5012; A61H 2201/5043; A61H 2201/5048; A61H 3/061; A61H 2201/5097; A61H 2201/501; A61H 2201/1604; A61H 2201/165; A61H 2201/5064; A61H 2201/5084; A61H 2201/5092; G01C 21/20; G01C 21/206; G01C 21/3641; G01C 21/387
See application file for complete search history.

(56) References Cited

U.S. PATENT DOCUMENTS

| 2006/0247849 | A1 | 11/2006 | Mohsini et al. |
| 2009/0222492 | A1 | 11/2009 | Moshe |
| 2011/0153193 | A1* | 6/2011 | Fox ........................ G01C 21/20 701/533 |
| 2011/0307172 | A1 | 12/2011 | Jadhav et al. |
| 2012/0062357 | A1* | 3/2012 | Slamka .................. G01C 21/20 340/4.11 |
| 2013/0196681 | A1 | 8/2013 | Poduri |
| 2015/0330787 | A1* | 11/2015 | Cioffi ..................... G01C 21/20 701/538 |

OTHER PUBLICATIONS

Written Opinion of the International Searching Authority, issued by the Israel Patent Office on Mar. 1, 2022.
WAYFINDER: Open Standard for Audio-based wayfinding, Version: Recommendation 1.1 Published Dec. 1, 2017.
Extended European Search Report for application No. 22736678.8-1218 / 4274535 PCT/IB2022050017.

* cited by examiner

GUIDING A PERSON WHILE MOVING IN A CERTAIN AREA

CROSS-REFERENCE TO RELATED APPLICATIONS

The current PCT application claims the benefit of the prior filing date under Title 35, U.S.C. .sctn. 119(e) of the United States provisional application for patent that was filed on Jan. 8, 2021 and assigned the Ser. No. 63/135,043, which application is herein incorporated by reference in its entirety, and entitled "GUIDING A BLIND PERSON WHILE MOVING IN A CERTAIN AREA", which application is herein incorporated by reference in its entirety.

FIELD OF THE DISCLOSURE

The present disclosure relates to the field of accessibility and mobility services for a Person with Reduced Mobility (PRM) while traveling. The PRM can be a low vision person, a visually impaired, a person in a wheel chair or a blind person, etc., while he or she is moving in a certain area. The certain area can be a train station, a cabin of a train or tram, a bus, etc. Alternatively, the certain area can be a mall, a hall, an office building, etc. Along the present disclosure and the claims, the terms low vision person, a visually impaired, a Person with Reduced Mobility (PRM), he, she, a user, a person that has a hearing disability, or any other disability may be used interchangeably and the term PRM may be used as a representative term of this group.

BACKGROUND

A blind, who wishes to travel by public transportation, may face a problem how to navigate in a station in order to take the right bus or the right train. On the other hand, a blind that is already in a cabin of a bus or a train and needs to step down or get off the train may face a similar problem to find a near door in the cabin, etc. Next, on the platform, the blind has to navigate in the station in order to find the appropriate gate, stairs, or elevator that can lead him out of the station or to another platform from where the blind can continue his trip.

In a similar way a blind person may face a problem how to navigate in a concert hall, mall, etc. in order to find a desired location. The desired location can be a certain shop, stairs, an elevator, etc.

Further, when a train arrives to the station the blind, who has succeeded to find the correct platform and the correct side of the platform, needs to find the location of a near door of the train and in some cases to find the location of a push bottom that opens the door. Currently, common vocal announcement, in a train station, just announce that a train of a certain line has arrived to the platform.

In addition, a blind on the train may be informed about the name of the coming station without any indication whether the platform is on the right or left side of the train or indication on the near door. Furthermore, there are cases in which there is a difference, a gap between the height of the platform and the height of the train. In such a case a blind cannot be aware of the height differences. Moreover the blind, before stepping down from the train has to decide whether to go left, right or forward in order to continue his trip. Last but not the least, a blind prefers to have free hands in order to use his hands for navigating.

Along the present disclosure and the claims, the terms a train, a bus, a tram, a subway, an underground train, or an airplane may be used interchangeably and wherein the term train may be used as a representative term of this group. In a similar way the terms a train station, a bus station, a cabin of a vehicle, a hall, a concert hall, a mall, a certain area, and an airport may be used interchangeably and wherein the term station may be used as a representative term of this group.

In case of an airport a blind person needs to navigate to the door of the departure hall. Then to find his way to the appropriate ticket-purchasing-counter, ticket validation point, from there to the boarding gate, etc. During off board from an airplane a blind person leaving the sleeve, which is connected to the airplane, has to decide whether to go left or right, where is the baggage claim carousel, passport control, outdoors etc. In a similar way in a concert hall or a mall, the blind needs to visit a toilet, a kiosk, etc. Consequently, a blind that go out of his home is in stress from the starting point of the trip to the final destination.

In a similar way, a person with hearing disability may not hear audio messages that are given by a paging system of a station or a vehicle. A person in a wheel chair may need wayfinding instructions toward an elevator, for example.

BRIEF SUMMARY

The needs and the deficiencies that are described above are not intended to limit the scope of the inventive concepts of the present disclosure in any manner. The needs are presented for illustration only. The disclosure is directed to a novel technique for guiding a PRM while moving out of his territory. For example, when the PRM is traveling by public transportation or is walking in a mall, etc.

In order to guide a user of the disclosed technique, an example embodiment of the disclosed technique may ask the user about his/her disability and accordingly the system may guide the user. In order to guide a blind, an example embodiment of the disclosed technique may comprise a non-transitory computer readable storage device comprising executable instructions that when executed cause a processor at a mobile device of the blind to communicate with the GPS module of the mobile device in order to get indication that the blind has arrived to the certain area. The certain area can be such as but not limited to a train station. Alternatively, the certain area can be a mall, a hall, an office building, etc. Then, the processor can communicate with a server of a guiding system in order to get information about the train station.

In cases that the disability of the user is hearing disability the guiding instruction can be text messages or icons displayed over the display of the MD or displayed over a dedicated sign in a train station, for example. In cases that the user is using a wheel chair, then the novel technique can guide the user toward an elevator, instead of an escalator for example.

Upon getting the destination, an example embodiment of the disclosed technique may search its database (DB) and offers one or more alternative paths and lets the user to selects a prefer path. Alternatively, after entering to the station, the user can request for wayfinding instructions in order to guide him to a platform that is associated with the line, which is required by the user. Some embodiment of the disclosed technique can be configured to give wayfinding instructions to a user in order to guide him to a point-of-interest (PoI), which are located in the station. A PoI can be: an exit, a toilet room, a platform, a corridor, stairs, an elevator, a ticketing counter, a restaurant, an information desk, a kiosk-machine, ticketing machine, for example.

The communication with a blind can be executed by vocal instructions via the blind's mobile device. Along the present disclosure and the claims, the terms smartphone, a mobile telephone, a personal digital assistant, a dedicated control unit, or a computer may be used interchangeably and wherein the term mobile-device (MD) may be used as a representative term of this group.

An example embodiment of the disclosed technique may guide a blind person along the path from entering to the station toward the required destination in the station. The disclosed system may guide the blind toward an appropriate opening in a hall of the station, corridors, stairs or elevators that lead toward the required destination. The required destination can be a platform, a ticketing counter, or any other destination that is associated with the disclosed embodiment of the system. The other destination can be such as but not limited to a toilet room, a restaurant, an information desk, etc.

In some embodiment of the disclosed technique a buzzer and or a speaker can be associated with the required destination in order to add acoustic signal as an additional guiding element. Usually, the buzzer can be the final guiding element that guides the blind toward the desired destination. In some embodiment of the disclosed technique the buzzer can be configured to deliver tones that are different from the tones that are used by a common buzzer of the station or the vehicle. Alternatively, a vocal instruction can be given via the speaker that is associated with the desired destination. Along the present disclosure and the claims the terms speaker and buzzer may be used interchangeably and the term speaker may be used as a representative term of this group.

In embodiment, in which a speaker is associated with the required destination, the system can be configured to deliver personalized audio messages via the speaker. An example of such an audio message may deliver detailed instructions for walking toward the required destination. An example of audio message can be: "step down and go right toward the escalators". If the person is a PRM an example audio message can be: "step down and go left toward the orange line". If the PRM uses a wheel chair then the system may give him instruction toward an elevator and so on.

When the blind is on the vehicle (a train, tram, bus etc.) an example embodiment of the disclosed technique may inform the blind when it arrives to the destination, the location of the platform in relation to the train (left or right side of the train), difference in the height between the platform and the train. Further, information about the location of the near door in the cabin can also be given and the system may guide the blind toward the appropriate door. In some embodiment of the disclosed technique a buzzer can be associated with the door in order to add acoustic signal as an additional guiding element. Yet, in some embodiments a speaker can be associated with the door in order to deliver audio instructions to the blind. In some example embodiments. the speaker can be associated with the push-bottom that opens the door, In addition, an example embodiment of the disclosed technique can be configured to inform the blind what to do after departing from the train. An example of such a message can be "To the elevators toward John St. turn to the right". Guiding the blind can be done via his MD or via a speaker which is associated with the door which is in front of the blind.

Some embodiments of the disclosed technique may identify the blind when he arrives to the station and based on the information that was loaded at the beginning of the trip, the system may give audible wayfinding signal. In some cases, the audible wayfinding signal can be given by a buzzer that is located near a door, for example. In other cases, the audible wayfinding signal can be audible instructions that are given via the mobile telephone, guiding the blind toward the appropriate platform, gate or exit, etc. In some embodiments, the instructions can be given via a near speaker.

An example embodiment of the disclosed technique may comprise a Guiding-System-Cloud (GSC). An example of GSC may comprise one or more processors, one or more non-transitory computer readable storage devices comprising executable instructions that when executed cause a processor from the one or more processors to execute a task. In addition, the GSC may comprise one or more DBs; each DB can be associated with a train company, or a certain line of the train, or a station, or a concert hall, or a mall, etc.

A DB may store a scheme of each station that is associated with the system. The scheme can be divided to floors. The scheme of each floor may comprise the location of one or more platforms, one or more gates, location of stairs, elevators, or any other element that may be needed in order to guide the blind. In addition, the sachem may comprise elements that are on that floor. Elements such as but not limited to a toilet room, kiosk, one or more benches, etc.

In addition, the scheme may comprise the location of one or more wireless transmitter/receivers (WTR). An example of such a wireless transmitter/receivers can be based Bluetooth technology, a Bluetooth transmitter/receiver (BTR). In some example embodiments of the disclosed technique each BTR can be configured to communicate with an application that is executed by the blind's MD. The communication can be executed over a network that uses Bluetooth technology. Bluetooth wireless technology is well known to a person with ordinary skill in the art and will not be further disclosed. Other example embodiments of the disclosed technique a WTR may use WiFi technology instead of Bluetooth technology in order to communicate with the MD. WiFi technology is well known to a person with ordinary skill in the art and will not be further disclosed. Along the disclosure and the claims the Bluetooth technology is used as a representative technology for wireless high-speed data transfer over short distances. In some embodiments the BTR are using Bluetooth-Low Energy protocol (BLE).

Each WTR may have an identification number (ID). The MD of the user can be configured to send to each one of the WTRs a request to transmit its ID. The request can be sent via the Bluetooth module of the MD. In some embodiments the WTR are using Bluetooth-Low Energy protocol (BLE) that transmits its ID continually. In such embodiment the MD can be configured to respond to the transmission of the WTR in order to establish a connection with that WTR.

In stations that are located in an open space the WTR can be installed on few pillars that can be distributed in the station area. Other example embodiments may use WiFi or Infrared techniques, as the physical layer, instead of Bluetooth. In some example embodiment of the disclosed technique the WTR can be associated with a speaker.

Some example embodiments of the disclosed technique can refer to a station as a local area network (LAN), in such embodiment the ID can be a private IP address of that WTR. Thus, each station can be an Intranet and the communication between the WTRs and the MD can be based on Internet Protocol (IP) messages carried over BLE network. In such embodiment, upon entering to the station the MD may get a private IP address to be used while it is in the station. In addition, the MD can be loaded with the scheme of that station. In addition, the MD of the blind can be configured to send a Ping message to a certain WTR and measure the round-trip time (RTT) in order to calculate the distance of the blind from that WTR. In such embodiment a Network Address Translators (NAT) gateway can be added to each station in order to communicate with devices that are not in the station.

After receiving the response from at least two of the WTRs. The MD can be configured to process the obtained responses and to determine the location of the blind in the station/platform. One example embodiment of the disclosed technique can be configured to determine the location of the blind in the station by using Received Signal Strength Indicator (RSSI) algorithm. The RSSI algorithm can be used in order to determine the distance of the blind from the responding audio transmitter/receivers. Then based on the scheme and the calculated distances, an example embodiment of the disclosed technique can determine the location of the blind in the station. The RSSI algorithm for calculating the distance between a transmitter and a receiver is well known to a person having ordinary skill in the art and therefore will not be further disclosed.

Another example embodiment of the disclosed technique can be configured to measure the RTT between the MD and a WTR as the period of time between sending a request toward the WTR and obtaining the response. Based on knowing the speed or RF signal in the air and the value of the RTT, an example embodiment of the disclosed technique can calculate the distance between the blind and the relevant WTR. For example, the speed of RF signal in the air is equal to the speed of light, which is approximately 300,000,000 meter/second. Thus, each nanosecond delay between sending the request and obtaining the request at the destination can represent approximately 0.3 meters. Thus, an RTT of one nanosecond is equal to a distance of 0.15 meter (15 cm). In some cases, in which the clock rate of the MD is about 2.4 GHz, then 16 pulses of the clock can represent a distance of a meter.

After calculating the distance from at least two WTRs the MD can be configured to calculate the location of the blind in the station and based on the store scheme of the relevant station the MD can give audible wayfinding instructions to the blind. In another example embodiment of the disclosed technique the MD of the blind can be configured to report to the GSC the time interval from each WTR and let the GSC to define the location of the blind and report it to the MD.

An example embodiment of the disclosed technique may calculate the location (X, Y, Z) of the blind in the station by projecting 3 axis on the scheme wherein the central point (0,0,0), the junction of the 3 axis is placed on the desired location (a gate, an exit, a toilet room, kiosk machines, etc). Accordingly, each WTR can be associated with its coordinates. For example (X1, Y1, Z1) can represent the location of the first WTR and so on. D1 may represent the calculated distance between the first WTR and the blind. In a similar way the other two equations refers to other two WTRs. The unknown variables X, Y, Z are the coordinates of the blind. Solving the following three equations may give the coordinates of the blind in the station.

$$(D_1)^2 = (X1-X)^2 + (Y1-Y)^2 + (Z_1-Z)^2$$

$$(D_2)^2 = (X_2-X)^2 + (Y_2-Y)^2 + (Z_2-Z)^2$$

$$(D_3)^2 = (X_3-X)^2 + (Y_3-Y)^2 + (Z_3-Z)^2$$

The process can repeat itself in a cyclic mode having a period in the range of one to five seconds for example. An example period can be 3 seconds. Some example embodiment can be configured to change this period (repetition time) proportionally to the distance between the blind and a point in which the blind needs to change direction. The repetition time can be changed according to the nature of the area. In an open space the repetition time can be longer while in a busy area the repetition time can be shorter.

Some example embodiments of the disclosed technique can be configured to overcome echo problems by transmitting the ping request and waits to get the ping response from the relevant WTR. The WTR can be configured to respond to the first ping request and ignores one or more following echoes that were received close to the ping request. The MD can be configured to handle the first obtain response within that interval. An example embodiment of the disclosed technique can use an interval of few milliseconds as the interval in which an echo can be received.

Similar process can be used in the cabin of the train or the tram in order to lead the blind toward a near door. Each cabin may have two or more WTRs that can be used for identifying the location of the blind in the cabin. Then, a message indicating that a blind is in a certain cabin can be transferred to the Tram-Control-Management-System (TCMS). In some embodiments after sending the message the connection between the WTRs and the TCMS remains active until the blind leaves the cabin.

Some embodiments of the disclosed technique can be configured to instruct the TCMS to open a door of the cabin, which is near the blind. Then the system may give audible wayfinding signal. In some cases, the audible wayfinding signal can be given by a buzzer that is located near the door. In other cases, the audible wayfinding signal can be audible wayfinding instruction toward that door that can be given to the blind via his MD. In some example embodiment of the guiding system the WTR can be configure to activate the buzzer, which is associated with that door alternatively a vocal instruction can be given via the speaker that is associated with that door.

Defining the closest door in the cabin can be implemented by configuring the MD to send a ping message to each one of the WTRs that are associated with the doors of the cabin on the side of the platform in the station that is the destination of the PRM. Then, the RSSI of the obtained ping responses can be compared and the WTR that has the highest RSSI can represent the nearest door. The buzzer that is associated with this WTR can be activated, by the guiding system, in order to pull the blind toward that door. Alternatively, an audio instruction can be given via a speaker which is associated with that door.

Some example embodiment of the disclosed technique can be configured to refer to a crossroads along the walking pattern of the blind as local area. In such embodiment each pillar of a traffic-light can be associated with a WTR and can be configured to deliver wayfinding instruction via the MD to the blind. The wayfinding instructions may comprise directions, timing when to cross a certain road and information regarding a gap between the height of the relevant sidewalk and the height of the relevant road and vice versa.

Some example embodiment of the disclosed technique may be configured to deliver wayfinding instructions to a user of an MD, who is waiting for a taxi. In such embodiment the taxi can be associated with a WTR, which can be the driver's MD. In addition, a speaker that is controlled by an example embodiment of the guiding system can be added to the roof of the taxi. When the system determines (based on the GPS of both MDs) that the MDs are close to each other, then the speaker of the taxi and/or the speaker of the MD may deliver vocal instructions to the user. Other embodiments of the disclosed technique may determine that the two MDs are close to each other based on RSSI technique, for example.

Yet, in some example embodiment of the disclosed techniques a ticketing machine can be configured to communicate with the GSC in order to deliver information about ticketing information. Information such as but not limited to relevant lines, prices, timing etc. Further, such a ticketing machine can be associated with a WTR. Then, an example of GSC may inform an MD of a blind about that ticketing machine and may lead him toward the ticketing machine. When the blind is associated with the machine the blind can send instruction to the ticketing machine via his MD. In a similar way a kiosk-machine can be configured to communicate with the GSC and the guiding application that is executed by the MD in order to serve the blind.

The above summary is not intended to summarize each potential embodiment or every aspect of the present invention, and other features and advantages of the present invention will become apparent upon reading the following detailed description of the embodiments with the accompanying drawings and appended claims.

Furthermore, although specific embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE DRAWINGS

Exemplary embodiments of the present disclosure will be understood and appreciated more fully from the following description in consideration of the accompanying drawings in which like reference numbers indicate like features and parts.

DETAILED DESCRIPTION OF SOME EXAMPLE OF EMBODIMENTS

Figure 1:
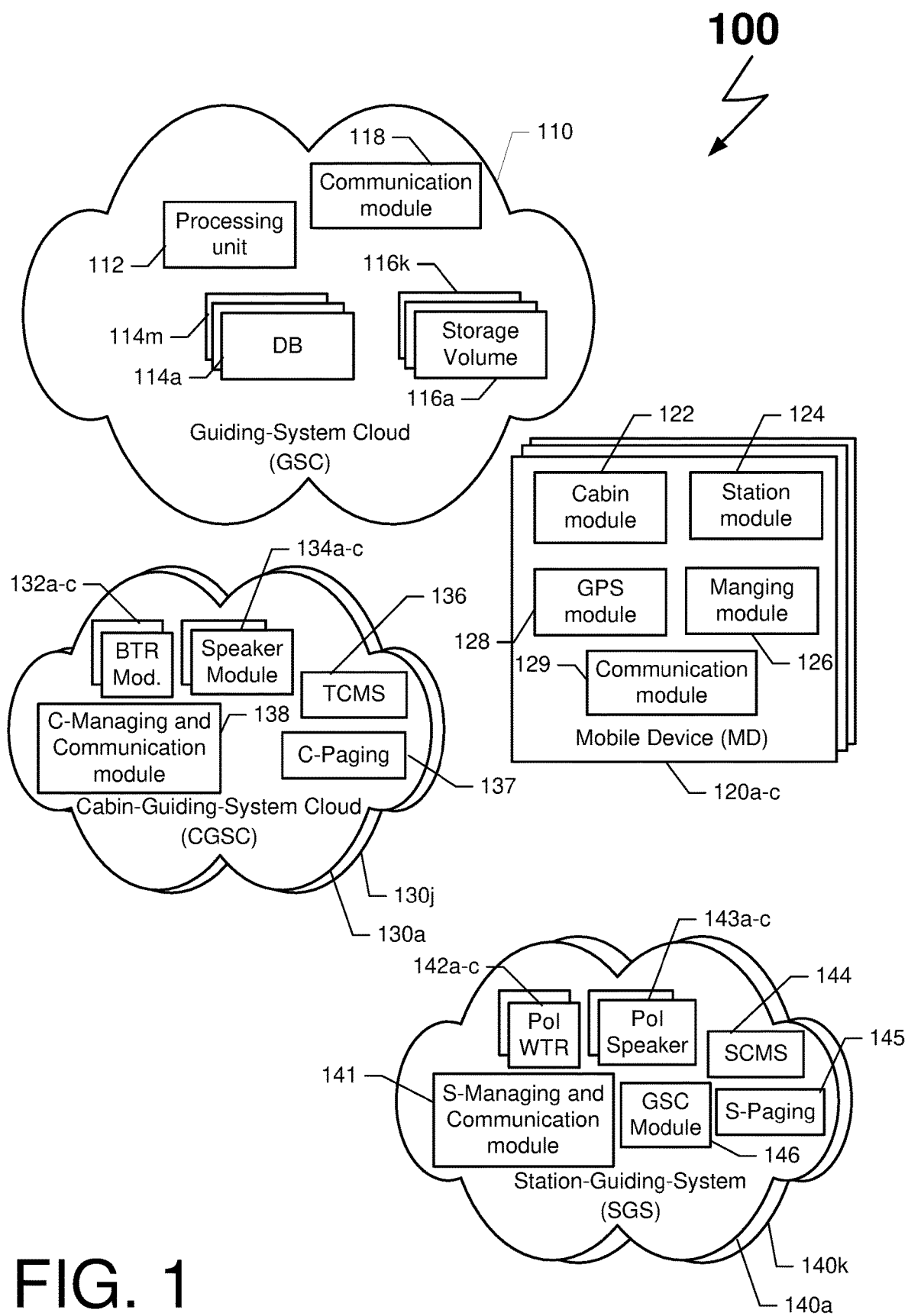
FIG. 1 illustrates a simplified block diagram with relevant elements of an example embodiment of a guiding system that operates according to the disclosed technique.

Turning now to the figures in which like numerals represent like elements throughout the several views, in which exemplary embodiments of the disclosed techniques are described. For convenience, only some elements of the same group may be labeled with numerals.

The purpose of the drawings is to describe examples of embodiments and not for production purpose. Therefore, features shown in the figures are chosen for convenience and clarity of presentation only. Moreover, the language used in this disclosure has been principally selected for readability and instructional purposes, and may not have been selected to define or limit the inventive subject matter, resort to the claims being necessary to determine such inventive subject matter.

In this specification, these implementations, or any other form that the invention may take, may be referred to as techniques. In general, the order of the steps of disclosed processes may be altered within the scope of the invention. Unless stated otherwise, a component such as a processor or a non-transitory computer readable storage device described as being configured to perform a task may be implemented as a general component that is temporarily configured to perform the task at a given time or a specific component that is manufactured to perform the task. Alternatively, the term 'processor' or storage device may refer to one or more cloud resources, that are configured to store or process data, such as computer program instructions.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software as desired, including any combination of cloud resources, $3^{rd}$ party resources, virtual machines, API, etc.

In the following description, the words "unit," "element," "module", "cloud resource", and "logical module" may be used interchangeably. Anything designated as a unit or module or cloud resource may be a stand-alone unit or a specialized or integrated module. A unit or a module may be modular or have modular aspects allowing it to be easily removed and replaced with another similar unit or module. Each unit or module may be any one of, or any combination of, software, hardware, firmware, and/or cloud-resource, ultimately resulting in one or more processors programmed to execute the functionality ascribed to the unit or module.

Additionally, multiple modules of the same or different types may be implemented by one or more processors. Software of a logical module may be embodied on a non-transitory computer readable storage device such as a read/write hard disc, CDROM, Flash memory, ROM, or other storage devices such as storage volume over a cloud, etc. In order to execute a certain task a software program may be loaded to an appropriate processor as needed. In the present disclosure the terms task, method, and process can be used interchangeably. The software of a logical module may run on a local processor or may run on a cloud virtual machine. Along the present disclosure and the claims, the terms memory device, storage device and storage volume may be used interchangeably.

FIG. 1 depicts a block diagram with relevant elements of an example environment 100 in which systems and/or methods, described herein, can be implemented. Environment 100 may comprise a Guiding-System Cloud (GSC) 110 one or more Cabin-Guiding-System Clouds (CGSC) 130*a-j*, one or more Station-Guiding-System cloud 140*a-k*, and one or more MDs 120*a-c*.

An example of a GSC 110 may comprise a processing unit 112, one or more DBs 114*a-m*, one or more storage volume 116*a-k* and a communication module 118. An example of processing unit 112 can be configured to manage the operation of the GSC 110. It can be configured to communicate, via communication module 118, with one or more transportation companies in order to collect information that may be needed during the operation of the system. The transportation company can be such as but not limited a train company, a tram company, a bus company, etc. The collected information can be such as but not limited to schemes of each floor in each station of each line of that train company, schemes of the different cabins, location of WTRs, etc. The collected information can be stored in one of DBs 114a-m.

In some embodiments each DB 114a-m can be associated with a train company, or a certain line of the train, or a station, or a concert hall, etc. The DB may store a scheme of each station that is associated with the system. The scheme can be divided to floors. The scheme of each floor may comprise the location of one or more platforms, one or more gates, location of stairs, elevators, or any other element that may be needed in order to guide the blind. In addition, the sachem may comprise elements that are on that floor. Elements such as but not limited to a toilet room, kiosk, one or more benches, ticketing-machines, etc, In addition, some of the schemes may comprise the location of one or more WTRs and one or more speakers. Each WTR and each speaker may be associated with an ID. In some embodiments the ID can be a private IP address that has been allocated by communication module 118. In some example embodiments of the disclosed technique each WTR can be configured to communicate with an application that is executed by the blind's MD 120a-c. The communication can be executed by using Internet Protocol over a network that uses Bluetooth protocol, for example. In some embodiments the WTR are using Bluetooth-Low Energy protocol (BLE).

An example of processing unit 112 may comprise a one or more processors (not shown in the figures), each processor can be configured to perform a certain task at a certain given time according to instructions that have been loaded to it from storage volume 116a-k. Storage volume 116a-k can be a non-transitory computer readable storage device such as but not limited to a read/write hard disc, CDROM, Flash memory, ROM, or any other storage devices such as storage volume over a cloud, etc.

In order to execute a certain task a software program may be loaded from Storage volume 116a-k to an appropriate processor from processing unit 112 as needed. In the present disclosure the terms task, method, and process can be used interchangeably. The software of a logical module may run on a local processor 112 or may run on a cloud virtual machine. More information on the operation of an example of GSC 110 is disclosed below in conjunction with FIG. 2 to FIG. 4a&b.

An example of MD 120a-c may comprise a cabin module 122, a station module 124, a GPS module 128, a managing module 126 and a communication module 129. Software of a module may be embedded in a non-transitory computer readable storage device such as a CDROM, a Flash memory, a ROM, or other storage device (not shown) of the MD 120a-c. In order to execute a certain task a software program may be loaded to an appropriate processor. Thus, each module 122 to 129 can be a processor, which has been loaded with an appropriate software program, for example.

An example of cabin module 122 can be configured to communicate, via the communication module 129, with one or more WTRs 132a-c and speaker 134a-c that are associated with the doors of the cabin in which the MD 120a-c is currently associated with. When the blind with the MD 120a-c is at a platform intending to step on the train, then the relevant WTRs 132a-c and speaker 134a-c can be the ones that are located outside the cabin. When the blind with the MD 120a-c is in the cabin and intend step out of the train, then the relevant WTRs 132a-c and speaker 134a-c are the ones that are located inside the cabin on the side of the relevant platform.

Further, the cabin module 122 can be configured to point on the near door. Defining the closest door in the cabin can be implemented by sending a ping message to each one of the WTRs that are associated with the doors of the relevant cabin on the side of the platform. Then, the RSSI of the obtained ping responses can be compared by the cabin module 122 and the WTR that has the highest RSSI can be point as the nearest door. The speaker that is associated with this WTR can be activated, by the cabin module 122, in order to guide the blind toward that door. Alternatively, an audio instruction can be given via a speaker which is associated with that door. More information on the operation of an example of cabin module 122 is disclosed below in conjunction with FIG. 4a&b. In some embodiments, the cabin module 122 can be configured to send a Ping message to a certain WTR and measure the RTT in order to calculate the distance of the blind from that WTR.

An example of station module 124 can be configured to communicate, via the communication module 129, with one or more WTRs 142a-c and speaker 143a-c that are associated with the station 140a-k to which the MD 120a-c is currently entered. When the blind with the MD 120a-c is entering to the station, then the station module 124 may lead him along a path from entering to the station toward the required destination. An example of station module 124 may guide a blind toward an appropriate opening (exits, entrance, etc.) in a hall of the station, to corridors, stairs, escalators, or elevators toward the required destination. Some example embodiments may announce the direction (up or down) of the escalators or the elevators.

The required destination can be a platform, or a ticketing counter, or a toilet room, a restaurant, an information desk, kiosk-machine, etc. In some embodiment of the disclosed technique a speaker 143a-c can be associated with the required destination in order to add audio guiding instructions. Usually the speaker 143a-c can be the final guiding element that pulls the blind toward the desired destination.

An example embodiment of the disclosed technique can be configured to deliver personalized detailed instruction, via a near speaker. Examples of personalized audio message can be: "step down and go left toward the orange line", or "turn left and go 10 steps", etc. If the user is a PRM who uses a wheel chair, then the system may guide him toward an elevator, for example. If the user is a PRM that has hearing-disability, then the system may guide him by text messages that are displayed over his/her MD, for example.

Some example embodiments of the disclosed technique can be configured to determine when a user of the system made a mistake. Upon determining that a mistake was made, the system may inform the user about the mistake and may offer a path that will correct the mistake and let the user to determine how to proceed. Or at an emergency situation, send the relevant instructions.

Upon arrival to the correct platform an example of station-module 124 may check with the Station-Control-Management-System (SCMS) 144 the arrival time of the next required train, in which side of the platform the train will stop, and the horizontal and vertical gaps, if exist, between the train and the platform. In some embodiments the SCMS 144 may inform the PRM about the crowding in relevant cabins. Next the station module 124 can transfer the obtained information to the blind. Few minutes before the arrival of the train an example of the station module 124 can give a trigger to the blind. More information on the operation of an example of station-module 124 is disclosed below in conjunction with FIG. 3.

An example of Global Positioning System (GPS) module 128 can be configured to define the location of the blind outside of the station and together with a guiding application such as but not limited to Google-Map may lead the blind when he walks in the streets. Further, GPS module 128 can use one of Google-map APIs (application program interface) for communicating with Google-Map application in order to be informed that the blind has arrived to the station. Google-Map is a trade mark of Google LLC.

An example of managing module 126 can be configured to manage the activity of MD 120 while using the guiding system. An example of managing module 126 can be configured to prompt the blind while planning a journey. Further, in some example embodiments the managing module 126 can be configured to determine when to switch from the GPS navigating system to a local area guiding system. More information on the operation of managing module 126 is disclosed below in conjunction with FIG. 2.

An example of communication module 129 may be configured to connect the internal modules of MD 120 with other elements of environmental 100. Communication module 129 can connect MD 120 with elements of GSC 110 by using IP packets carried over cellular network, for example. Communication module 129 can associate the MD 120 with elements of cabin-guiding-system cloud (CGSC) 130a-j or elements of SGS 140a-k by using IP packets over BLE, for example. Another example embodiment of communication module 129 can be configured to communicate with the CGSC 130a-j or SGS 140a-k by using Ethernet frames over BLE.

Some example embodiments of MD 120 can be configured to instruct the user to take few pictures of the surrounding and to transmit them toward GSC 110 to be processed by one of the processing units 112a-n. In such embodiment the processing unit 112 can be configured to process the images and compare them to a bank of pictures that are stored in one of the DBs 114a-m in order to define the location of the user.

An example of a CGSC 130a-j may comprise two or more WTR modules 132a-c, two or more Speakers modules 134a-c, a TCMS module 136 a cabin-paging module 137 and a cabin-managing-and-communication module 138. In an example embodiment in which the number of WTRs 132a-c and speakers 134a-c may be equal or greater than the number of doors. Then each door can be associated with a WTR 132a-c and a speaker 134a-c. The rest of the WTRs 132a-c and a speakers 134a-c, if exist, can be spread in the cabin. A scheme of the cabin that includes the seats, the doors, the location of the WTRs 132a-c and the speakers 134a-c including the ID number of each one of them, as well as the ID of the cabin and the doors can be loaded to one of the DBs 114a-m in the GSC 110.

The TCMS module 136 can be used as the interface between the cabin-managing-and-communication module 138 and the control and management system of the train and with the driver of the train. Via the cabin-managing-and-communication module 138, the CGSC 130a-j can inform the driver or the control and management system of the train that a blind is in that cabin, the desire destination of the blind, to report when the blind is near a certain door and to report when the blind step down and arrived safely to the platform, etc. Further, in some example embodiments of the disclosed technique the GSC 110 can be configured to retrieve the scheme of that cabin from the DBs 114a-m and send it toward the CGSC 130a-j to be use for generating the wayfinding instructions. In other example embodiments of system 100 the cabin-managing-and-communication module 138 can be configured to download the scheme of that cabin from one of DBs 114a-m.

In the other direction the cabin-managing-and-communication module 138 may obtain indications and commands from the driver or the control-and-management-system of the train. The indications can include messages about the next station, the arrival to the next station, the location of the platform and the vertical and horizontal gaps between the train and the platform as well as to which direction to start walking, etc. The cabin-managing and communication module 138 may be configured to convert those messages into audible wayfinding signals. In some cases, the wayfinding signals can be audible wayfinding instruction that are delivered via the relevant WTRs 132a-c and speaker 134a-c. The relevant WTRs 132a-c and speaker 134a-c can be the ones that in the cabin near the blind. Yet, in some cases the audible wayfinding signals can be given via a buzzer that is associated with the desired location.

The communication between the cabin-managing-and-communication module 138 and the GSC 110 can be based on IP messages carried over cellular network, the communication with the WTR 132a-c, the speakers 134a-c and the MD 120 can be based on IP over BLE. The cabin paging module 137 can be the common paging system of the train, which is used to inform the passengers. More information on the operation of the CGSC 130a-j is disclosed below in conjunction with FIGS. 4A&B. Some example embodiments of the disclosed technique a train may comprise a NAT gateway in order to communicate with devices that are external to the cloud of the train.

An example of a SGS 140a-k may comprise two or more Point-of-Interest (PoI) WTR modules 142a-c, two or more PoI Speakers modules 143a-c, a Station-Control-Management System (SCMS) module 144 a station paging module 145, a station-managing-and-communication module 141 and a GSC module 146. Each cloud 140a-k can represent a floor in the station, a certain hall, etc. A PoI can be: an exit, a toilet room, a platform, a corridor, stairs, an elevator, a ticketing counter, a restaurant, an information desk, a kiosk-machine, for example.

Upon entering to a station, a scheme of the station can be loaded to the MD of the blind. The scheme can be divided into floors. The scheme of each floor may comprise the location of the one or more PoIs and the ID of their associated WTR 142a-c and associated speaker 143a-c. In addition, the sachem may comprise elements that are on that floor. Elements such as but not limited to a toilet room, kiosk, one or more benches. The scheme may indicate the ID of the WTRs and speakers that are associated with each PoI.

The SCMS module 144 can be used as the interface between the station-managing-and-communication module 141 and the control and management system of the station. Via station-managing-and-communication module 141 the SGS 140a-k can inform the driver or the control and management system of the train that a blind is in that floor of the station, the desire destination of the blind, etc. Few minutes before the arrival of the train, an indication, from the management system of the station, can be sent via SCMS module 144 informing the blind the line number of the train, final destination, in which side of the platform the train will stop, etc. In some embodiments such information can be delivered to the user via the station paging system 145.

An example of station-managing-and-communication module 141 can communicate with the MD 120 of the blind by using IP messages carried over a wireless connection that is based on BLE protocol, for example. In addition, the station-managing-and-communication module 141 can communicate with the GSC 110 by using IP messages carried over cellular network. An example of GSC module 146 can represent the GSC 110 in that floor of the station. In such embodiment GSC module 146 can communicate with the MD 120 via the station-managing-and-communication module 141 in order to guide the blind in the station.

The station paging module 145 can be a common paging system of the station, which is used to inform the passengers. In such embodiment a NAT gateway can be added to the station-managing-and-communication module 141 in order to communicate with devices that are external to the cloud of the station. More information on the operation of the SGS 140*a-k* is disclosed below in conjunction with FIG. 3.

Figure 2:
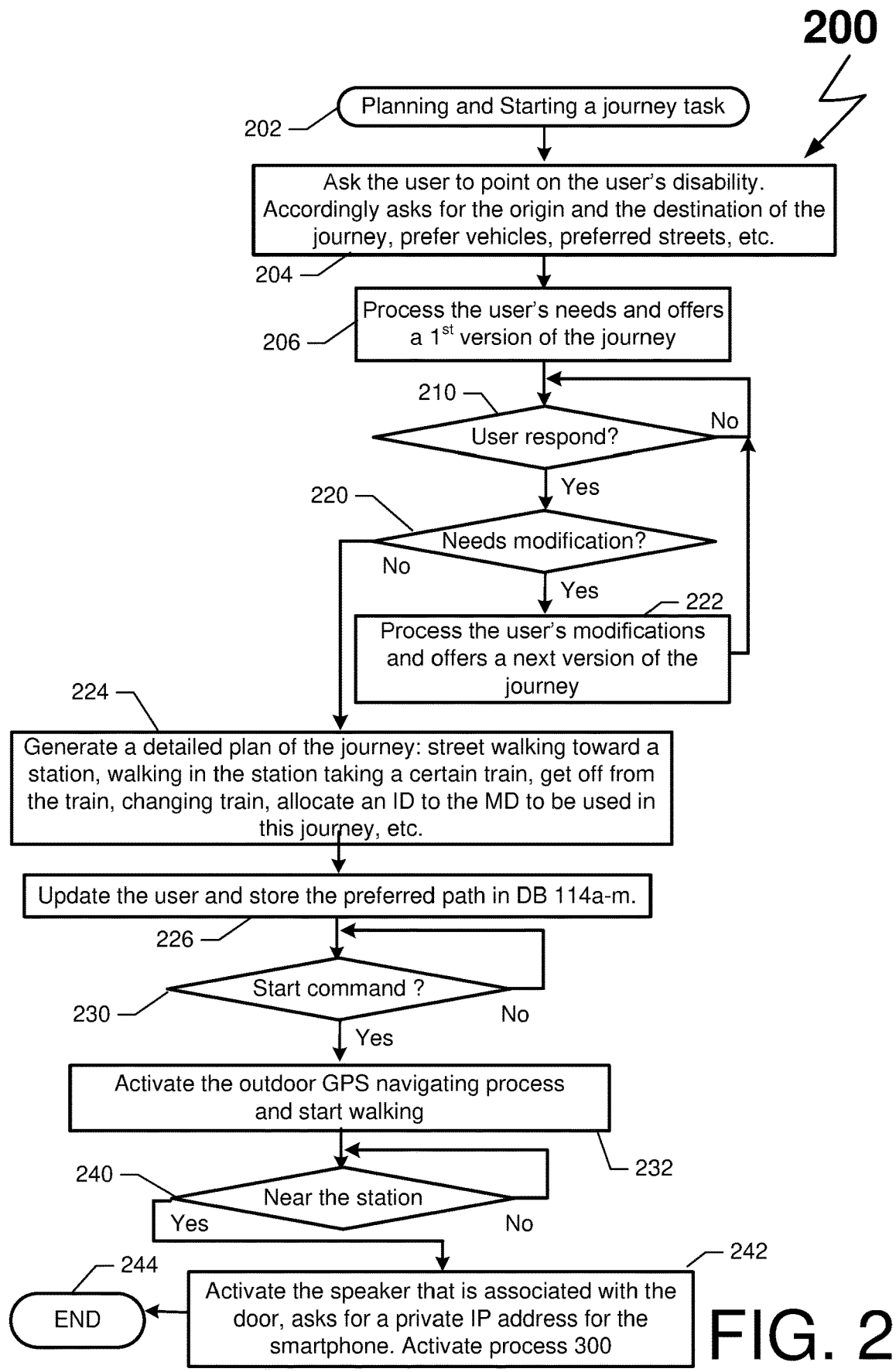
FIG. 2 schematically illustrates a flowchart showing relevant processes that can be implemented in order to initiate an example of guiding process.

FIG. 2 schematically illustrates a flowchart showing relevant processes that can be implemented in order to plan and initiate a journey task 200. Process 200 can be used for guiding a blind person from an origin, such as but not limited to his home, toward a desired destination. Instructions of the disclosed process 200 can be stored in a non-transitory computer readable storage device such as but not limited to storage volume 116*a-k* (FIG. 1). In order to execute process 200 the stored executable instructions can be downloaded to the MD 120 (FIG. 1) and be executed by the managing module 126. After initiation 202, an example of process 200 can ask 204 for information that is related to that journey.

The requested information 204 may comprise the user's disability. This question can be presented by a text message that can be displayed on the MD and simultaneously a vocally question can be asked via the speaker of the MD. According to the disability process 200 may proceed vocally (for a blind person) or by text messages for a person with hearing disability. Information about the origin, the destination, preferred vehicles, preferred streets, etc. can be gathered.

The collected information can be processed 206 by the managing module 126 together with processing unit 112 (FIG. 1), which reside in the GSC 110 (FIG. 1) in order to offer a first version of the journey. After offering 206 the first version, process 200 may wait 210 to obtain the user response. After obtaining the user response, a decision is made 220 whether the user ask for modification.

If 220 the user asks for modification then in block 222 the modifications can be processed and a next version of the journey can be presented 222 to the user. The next version may offer different line of a tram or a train, other walking streets that the blind prefers, etc. Then, process 200 may wait 210 to obtain the user response. If 220 the user does not ask for modification, then process 200 may proceed to block 224.

In order to offer a version of the journey processing unit 112 (FIG. 1) may collect information about stations of different public transportation companies, may check for the lines that passes via those station, check for the number of switching between lines along the journey, etc. After collecting this information and according to the user's needs processing unit 112 may offer, via the managing module 126, a version with minimum changing lines and/or less busy streets or/and busy stations, etc. If the user is a PRM, then the offered version may include stations with elevators, for example. If the user is a blind, then the offered version may include less crowded streets or less crowded stations, less noisy places, etc.

At block 224 a detailed plan of the preferred path of the journey can be generated. The detailed plan may include walking along certain streets toward a station, walking in the station, taking a certain train or bus or tram, get off the vehicle, changing vehicle, etc. Next, the preferred plan can be stored in one of DBs 114*a-m* and the user can be vocally updated that the guiding system is ready and process 200 may wait 230 to get the start command from the user. The stored data can be used by GSC 110 (FIG. 1) in order to execute machine-learning algorithm for predicting preferred vehicles (train, tram, bus, etc.), preferred lines, etc. according to the disability of the user.

After obtaining the start command managing module 126 (FIG. 1) may activate 232 the GPS module 128 and calls the street-guiding-application such as but not limited to Google Map in order to guide 232 the user toward the station of the public transportation. Google Map is a trade mark of Google LLC. USA. Other example embodiments may use another street-guiding-application. Other example embodiments of the disclosed technique may ask the user to select the user's preferred street-guiding-application Next, process 200 may wait 240 until the user is close to the station. The decision whether the user is near to the station can be based on the distance indication that is delivered from the street guiding application. In some embodiments the MD 120 (FIG. 1) can determine that it is near the station by receiving a handshake message from a WTR that is associated with the entrance of the station. If 240 the user is near the station, then the speaker that is associated with the entrance to the station can be activated and start delivering 242 personalized audio wayfinding instructions. In some embodiments RSSI calculations can be used in order to lead the user toward the entrance of the station.

In addition, managing module 126 may ask 242 the processing unit 112 (FIG. 1), via the communication module 129, for an ID that will be used by the MD 120 along this journey. The ID can be a private IP address that is allocated by communication module 118 (FIG. 1). Then process 300 can be activated and process 200 can be terminated 244. In such embodiment a Network Address Translators (NAT) gateway can be added to each cloud in order to communicate with devices that are external to that cloud.

Some example embodiments of the disclosed technique may store the detailed plan that was generated in block 224. The detailed plan can be stored in one of the DBs 114*a-m* (FIG. 1) in association with the user ID, the origin and the destination of that journey. In such embodiment, during a next time that the user would like to travel along this journey, then process 200 can be modified by adding a process after block 204 to retrieve, from DBs 114*a-m* the stored detailed plan and to jump to block 230. In such example embodiments a blind person may have a library of paths of repeating journeys.

Some example embodiments of process 200 may have a modified block 240. In such embodiment process 200 may also verify at block 240 that the blind is on the right path. If not, a correction can be delivered to the blind.

Figure 3:
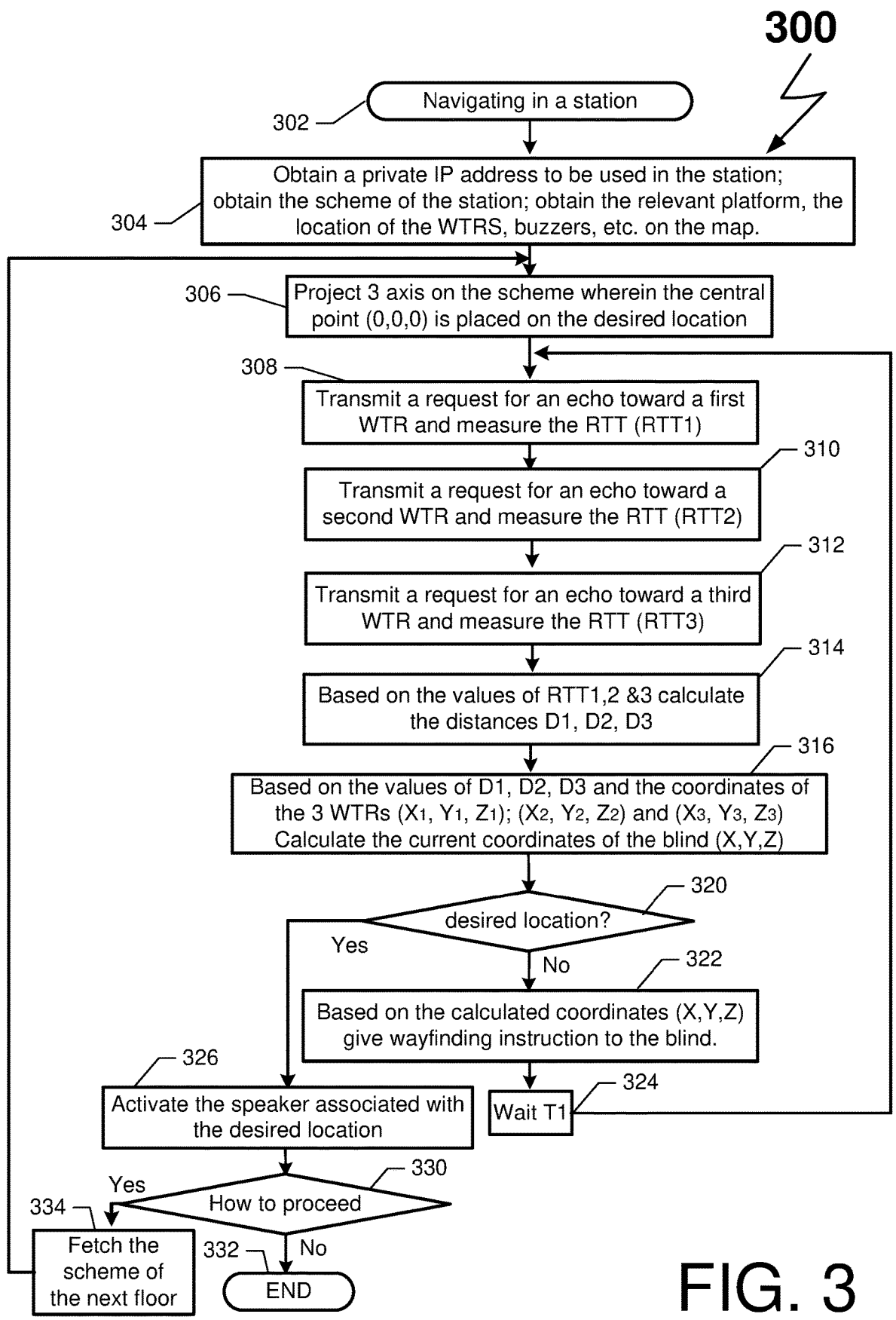
FIG. 3 schematically illustrates a flowchart showing relevant processes that can be implemented for guiding a blind in a station.

FIG. 3 schematically illustrates a flowchart 300 showing relevant processes that can be implemented by a station module 124 of MD 120, for guiding a blind in a station, for example. Instructions of process 300 can be stored in a non-transitory computer readable storage device such as but not limited to storage volume 116*a-k* (FIG. 1). In order to execute process 300, the stored executable instructions can be downloaded to the MD 120 (FIG. 1) and be executed by the station module 124. Process 300 can be initiated 302 by a blind upon entering to a station and activating the guiding application. Alternatively, process 300 can be initiated 302 automatically at the end of process 200 as it is disclosed above in conjunction with block 242 (FIG. 2). Entering to the station can be from the street or from a vehicle that arrives to the station. The vehicle can be a bus, a train, a tram, etc.

After initiation at block 304 process 300 may collect information that will be needed in order to guide the blind in the station. Information such as but not limited to an ID of the user MD, the ID can be a private IP address to be used in the station. The scheme of the station can be loaded from GSC 110 (FIG. 1), The scheme may include the WTRs and the speakers in that station with the ID of each one of them. In addition, the scheme may include the relevant platform, the side on the platform and the relevant line of the train, corridors, gates, etc. and the WTRs that are associated with those elements. This data can be stored in the MD. In some embodiments of the disclosed technique, the ID can be the private IP address that is used for communication in the station.

Next, 3 axes can be projected 306 on the scheme, wherein the origin of the axis can be placed on the desired location on that scheme, a gate or a kiosk-machine for example. At block 308 a request for an echo can be sent from the MD toward a first WTR and process 300 may measure the RTT from sending the request and getting the response. The measured RTT can be stored 308 as RTT1. In a similar way process 300 measures the RTT2 and RTT3 from other two WTRs (blocks 310 and 312). An example embodiment of the disclosed technique may select the three WTRs that are far from the user. Example embodiments of the disclosed technique that uses IP over Bluetooth for communication with the WTRs may use a ping message in order to measure the RTT.

Based on the values of RTT1, RTT2 and RTT3 and knowing the speed of light the distance between the blind and each one of the WTRs can be calculated 314. In an example in which the RTT is measured in nanoseconds, then an RTT of one nanosecond is equal to a distance of 0.15 meter (15 cm). Thus D1=0.15*RTT1, D2=0.15*RTT2, and D3=0.15*RTT3.

At block 316 based on the calculated distances (D1, D2, D3) and the coordinates of each one of the relevant WTRs [(X1, Y1, Z1); (X2, Y2, Z2); and (X3, Y3, Z3) the current coordinates (X, Y, Z) of the user can be calculated by solving the following three equations.

$$(D_1)^2=(X_1-X)^2+(Y_1-Y)^2+(Z_1-Z)^2$$

$$(D_2)^2=(X_2-X)^2+(Y_2-Y)^2+(Z_2-Z)^2$$

$$(D_3)^2=(X_3-X)^2+(Y_3-Y)^2+(Z_3-Z)^2$$

Based on the calculated coordinates (X, Y, Z) of the user, the location of the user can be placed on the scheme and a decision 320 can be made whether the user is in the desired location. If 320 not, based on the calculated coordinates (X, Y, Z) of the user, an embodiment of process 300 may deliver 322 updated audio wayfinding instructions toward the desired location. Then process 300 may wait 324 few seconds (T1 seconds), T1 can be in the range of one to five seconds, three seconds for example, in order to give time to the user to proceed along his path and process 300 returns to block 308 for a new measuring cycle.

If 320 the user is near the desire location, then at block 326 a speaker and/or a buzzer, which is associated with the desire location can be activated and give audio wayfinding instructions toward the desired location. At block 330 a decision is made how to proceed from the desire location, to go up or down, go out of the station, or stay on a platform, etc. If 330 the desired location is the end of the path, then process 300 can be terminated 332. In some cases, before terminating process 300 may activate the street-guiding-application for navigating from the station toward the final destination. When the end of the path 332 is at the desired platform, process 300 may inform the blind that is on the platform and may inform the SCMS that a blind is on the platform and the location of the blind in the platform.

If 330 it is not the end of the path, then a request for the next scheme can be sent 334, via communication module 129 (FIG. 1) toward the GSC 110 and process 300 returns to block 306 for guiding the blind in the next floor, for example.

Other example embodiments of the disclosed technique may place the origin of the three arises at the current location of the user. Some example embodiment of the disclosed technique may use RSSI techniques in order to define the location of the MD of the blind.

Figure 4A:
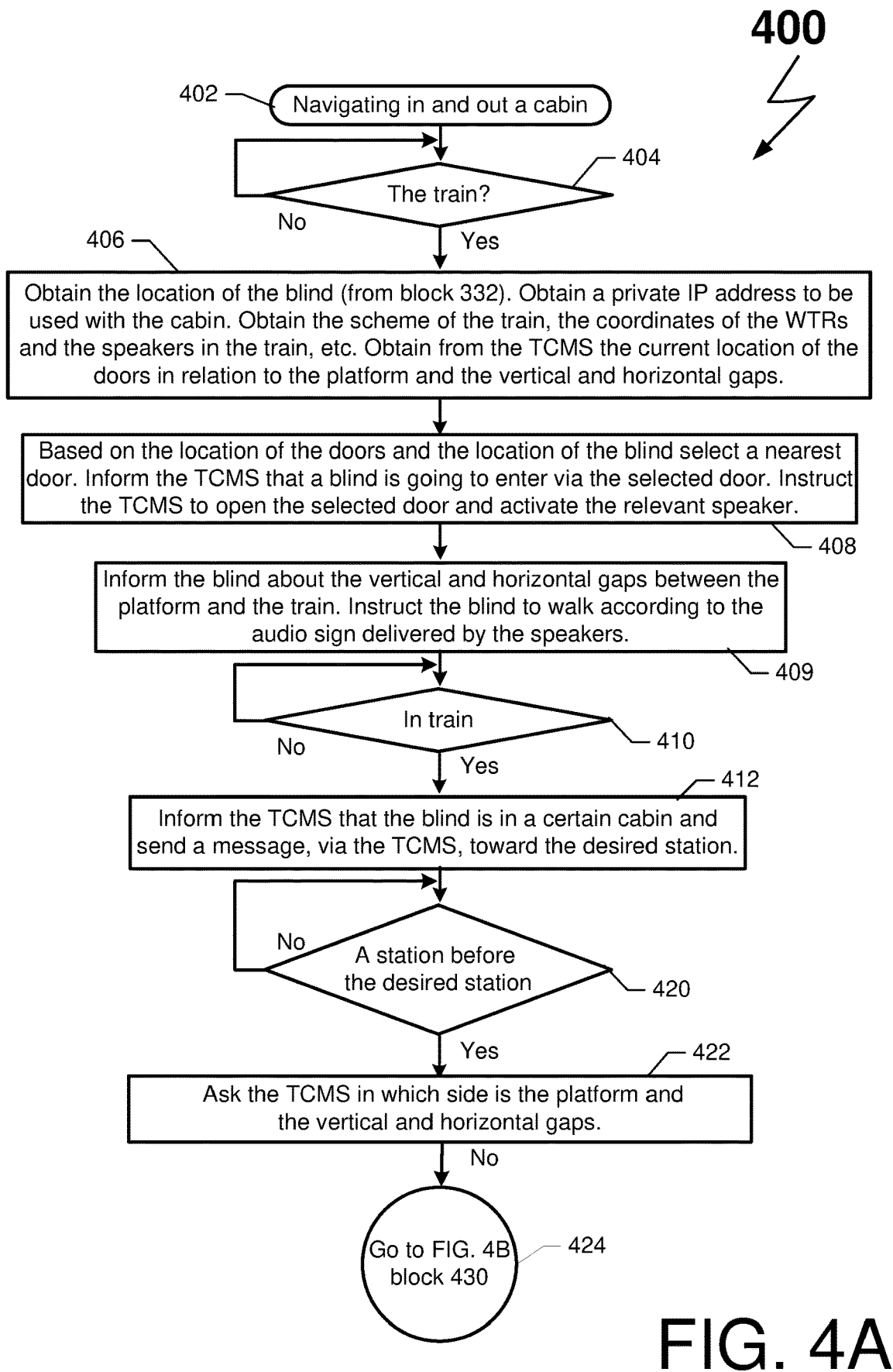
FIGS. 4A and 4B schematically illustrates a flowchart showing relevant processes that can be implemented for guiding a blind in and out of a cabin of a train.
Figure 4B:
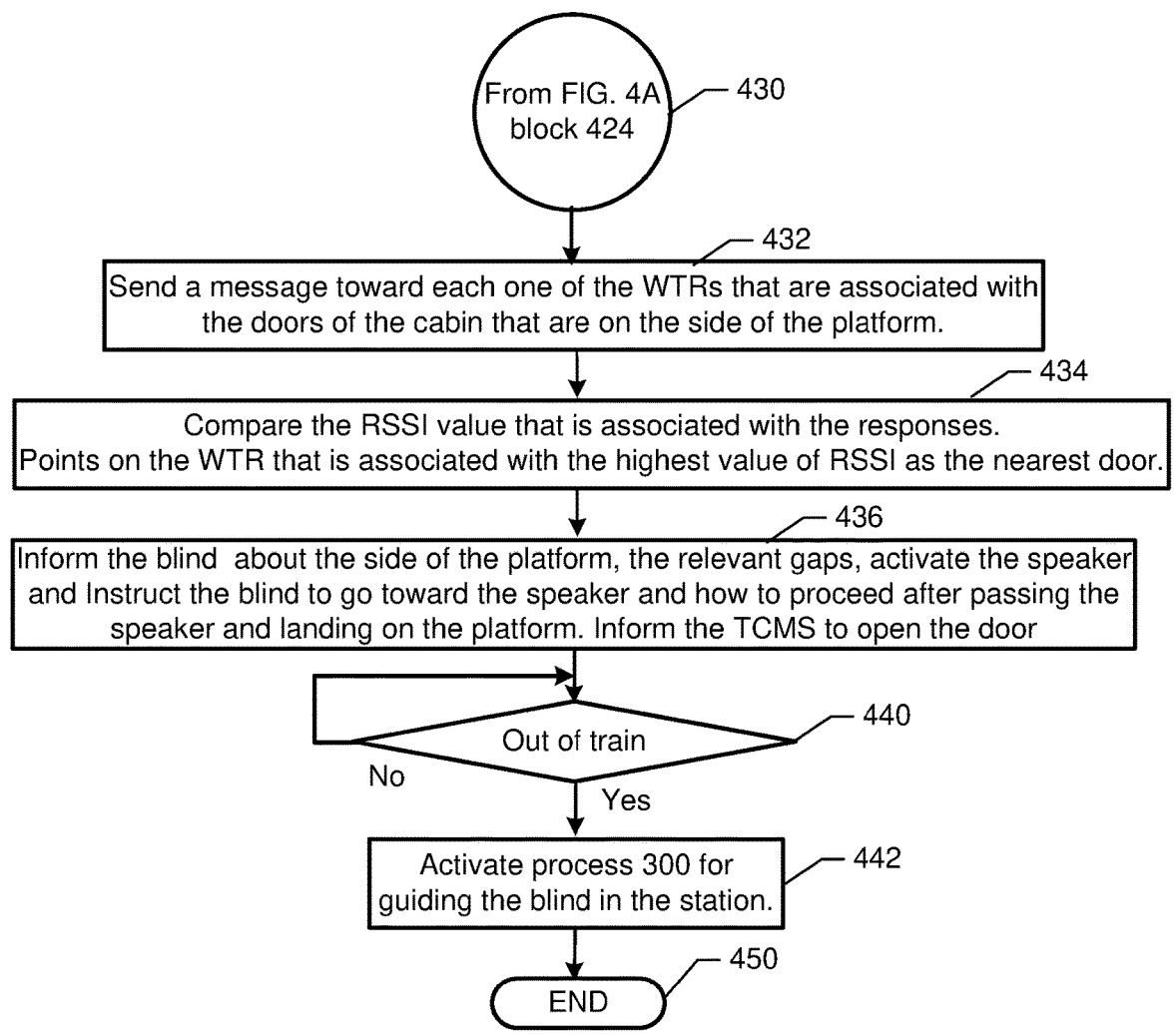

Referring now to FIGS. 4A and 4B that schematically illustrates a flowchart 400 showing relevant processes that can be implemented by cabin module 122 (FIG. 1) for guiding a blind in and out of a cabin of a train. Instructions of process 400 can be stored in a non-transitory computer readable storage device such as but not limited to storage volume 116*a-k* (FIG. 1). In order to execute process 400, the stored executable instructions can be downloaded to the MD 120 (FIG. 1) and be executed by the cabin module 122. Process 400 can be initiated 402 when the user is on a platform waiting for a vehicle. Alternatively, process 400 can be initiated 402 when the user is on the sidewalk near a crossroads and wishes to cross one of the roads.

At block 404 the process may wait until a vehicle is the station The vehicle can be a train, tram or a bus, for example. Upon entering of a correct vehicle into the station an indication can be delivered 404 from SGS 140*a-k* (FIG. 1) to the station module 124 of MD 120 (FIG. 1) or the paging system of the station. Upon receiving the indication process 400 may collect 406 the information that is needed in order to guide the blind to enter to a cabin of the vehicle. Information such as but not limited to an ID of the user MD in the cabin, the ID can be a private IP address to be used in the cabin. The scheme of the train can be loaded from GSC 110 (FIG. 1), The scheme may include the WTRs that are located in the train. Each WTR can be associated with two speakers; one is directed toward the inside the cabin and the other one is directed toward the outside of the cabin. The scheme may indicate the ID of each one of the WTRs and the speakers and the coordinates of each one of them in each cabin, etc.

Next at block 408 process 400 may select a door of the train that is near to the location of the blind, the nearest door, and inform the TCMS 136 (FIG. 1) to open the selected door and activate the relevant speaker. Some example embodiments of process 400 can be configured to open the door of the cabin. The location of the blind on the platform (X, Y, Z) was found and reported in block 326 (FIG. 3). The information may include indication on the side of the platform that is associated with the train, the location of one or more doors that are near the blind. In addition, information related to the vertical and horizontal gap (if exist) can be received from GSC 110 and be transferred 409 to the blind via a speaker that is associated with the nearest door. Then, audio wayfinding instructions that are given via the speaker that is associated with the nearest door can guide 409 the blind toward the nearest door. In some example embodiments, the TCMS 136 may instruct the driver to open the nearest door for a longer time, etc. In alternate embodiment, the TCMS 136 can be configured to open, automatically, the nearest door for a longer time.

At block 410 process 400 may wait until the blind is on the train. The decision can be made automatically by comparing the RSSI signals obtained from two or more WTRs that are near the relevant door. When the blind is at the cabin, then the TCMS 136 may be informed 412 that the blind is in the relevant cabin and the train can start moving. In some example embodiments additional information can be delivered by the MD to the TCMS 136, information such as but not limited to the desired station, next line, etc. In some embodiments of the disclosed technique the TCMS module 136 may inform the SCMS 144 (FIG. 1) that a blind or a PRM will arrive to the desired station on a specific cabin.

At block 420 process 400 may wait to the arrival to one station before the desired station. In some embodiment of the disclosed technique at block 420 process 400 may wait for leaving the station before the desired station in order to collect 422 information from GSC 110 (FIG. 1). Information that is related to the desired station. Information such as but not limited to the side of the next platform, the vertical and horizontal gapes between the train and the platform, to which direction the blind needs to move upon departing from the train, etc. Thus, the blind may have the information that will be needed upon arriving to the desired station. The information can be given via the user's MD or via the paging system of the cabin. Then process 400 may proceed 424 to block 430 FIG. 4B.

At block 432 a message can be sent toward each one of the WTRs that are associated with the doors of the cabin asking each WTR to respond with its ID. In some embodiments, in which the communication is based on IP the message can be a ping message toward each one of the WTRs that are associated with the side of the cabin that will associated with the platform in the next station. Then, the RSSI value that is related to the relevant WTRs can be compared 434 in order to point on the door with the highest RSSI as the nearest door.

Next, the blind can be informed 436 about the side of the train that is associated with the platform, relevant gaps, and how to proceed after departing from the cabin. Then a speaker that is associated with the nearest door may start giving wayfinding instructions toward that door. In some example embodiment an indication can be sent toward the TCMS 136 (FIG. 1) informing the driver to open the relevant door upon stopping in the next station and let the blind to step down. Some example embodiment of the disclosed technique can be configured to deliver personalized audio messages via the speaker that is associated with the door. An example of such an audio message may deliver detailed instructions for walking toward a required destination. An example of an audio message can be: "step down and go right toward the escalators".

At the station after opening the relevant door the process may wait 440 to get an indication that the blind is out of the train. The indication can be reached by getting information from WTRs that are located on the platform.

Upon determining 440 that the blind is out of the train and on a platform of the station then at block 442 the MD of the blind can activate the station navigation process 300 in order to navigate in the station and process 400 may be terminated 450.

In the description and claims of the present disclosure, each of the verbs, "comprise", "include", "have", and conjugates thereof, are used to indicate that the object or objects of the verb are not necessarily a complete listing of members, components, elements, or parts of the subject or subjects of the verb.

The present disclosure has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

The invention claimed is:

1. A non-transitory computer readable storage device comprising executable instructions that when executed cause a processor at a mobile device (MD) of a Person with Reduced Mobility (PRM):
   to communicate with a guiding-system cloud (GSC) in order to obtain information that is needed in order to give wayfinding signals to the Person with Reduced Mobility (PRM) toward a desired location by using a vehicle of public transportation;
   to communicate with a station-guiding-system (SGS) in order to obtain information that is needed in order to give wayfinding signals to the PRM, wherein the PRM is associated with a station of the public transportation company; and
   to plan a plan of a journey, based on the obtained information, and according to the PRM preferences; and
   to deliver wayfinding instructions, based on the plan, toward the desired location, and wherein the wayfinding signals to the PRM in order to step down from the vehicle of public transportation is given by a buzzer that is associated with a door of the vehicle of public transportation.

2. The non-transitory computer readable storage device of claim 1, wherein the vehicle is a train.

3. The non-transitory computer readable storage device of claim 1, wherein the plan comprises information related to a platform that will be used by the PRM.

4. The non-transitory computer readable storage device of claim 1, wherein the information related to the station further comprises information regarding a gap between the vehicle and a relevant platform.

5. The non-transitory computer readable storage device of claim 1, further comprising executable instructions that when executed cause the processor at the MD of the PRM to communicate with a taxi.

6. A non-transitory computer readable storage device comprising executable instructions that when executed cause a processor at a mobile device (MD) of a Person with Reduced Mobility (PRM):
   to communicate with a guiding-system cloud (GSC) in order to obtain information that is needed in order to give wayfinding signals to the Person with Reduced Mobility (PRM) toward a desired location by using a vehicle of public transportation;
   to communicate with a station-guiding-system (SGS) in order to obtain information that is needed in order to give wayfinding signals to the PRM, wherein the PRM is associated with a station of the public transportation company; and to plan a plan of a journey, based on the obtained information, and according to the PRM preferences; and to deliver wayfinding instructions, based on the plan, toward the desired location, and wherein the plan further comprises instruction to which direction to turn upon stepping down from the vehicle of public transportation to the platform.

\* \* \* \* \*